June 24, 1952   E. R. PRICE   2,601,628
POWER TRANSMISSION
Filed April 27, 1948   4 Sheets-Sheet 1

Fig. 1.

INVENTOR.
EARL R. PRICE
BY H. O. Clayton
ATTORNEY

Patented June 24, 1952

2,601,628

UNITED STATES PATENT OFFICE 2,601,628

POWER TRANSMISSION

Earl R. Price, South Bend, Ind., assignor to Bendix Aviation Corporation, South Bend, Ind., a corporation of Delaware Application April 27, 1948, Serial No. 23,520

8 Claims. (Cl. 74—472)

This invention relates in general to the power transmission mechanism of the power plant of an automotive vehicle and in particular to power and manually operated means for operating the change speed transmission mechanism of said power plant and for operating the throttle and the friction clutch to facilitate the operation of the transmission mechanism.

One of the objects of my invention is to provide, in an automotive vehicle including a fluid coupling, an overdrive control of the day, a friction clutch, an engine controlling throttle, an accelerator for actuating said throttle, a three speeds forward and reverse transmission, and a gear shift lever, means for operating and for controlling the operation of said transmission, an overdrive control including power means, comprising a single acting motor, and an intake manifold vacuum operated switch, said motor being automatically operable when the gear shift lever is placed in a certain position and after the manifold vacuum operated switch is closed, to establish the transmission either in its second gear setting or its high gear setting depending upon the speed of the vehicle, the friction clutch and the throttle being operated by said motor to facilitate this operation of the transmission, said means further including manually operated means for effecting any one of the gear settings of the transmission and means, operated by the accelerator, for controlling the operation of the overdrive control.

One of the most important objects of my invention, however, is to provide, in the power plant of an automotive vehicle, speed and intake manifold vacuum responsive power means for effecting successive upshift and downshift operations of the transmission mechanism of said plant, said transmission mechanism including a three speeds forward and reverse transmission unit and an overdrive unit of the day. With one embodiment of my invention this mechanism provides a four speeds forward and reverse transmission and with another embodiment of my invention this combination provides a five speeds forward and reverse transmission.

Yet another object of my invention is to provide, in an automotive vehicle including an accelerator, an accelerator operated throttle, and a transmission mechanism comprising a three speeds forward and reverse transmission and the aforementioned overdrive unit, power means for effecting successive upshift and downshift operations of said transmission mechanism, said operations being controlled in part by an intake manifold vacuum operated switch mechanism and a governor operated switch mechanism and being capable of operation when the accelerator is depressed to open the throttle to maintain the vehicle under way; and a further object of my invention is to combine with the aforementioned mechanism, means for automatically closing the throttle to facilitate the operation of the mechanism.

A further object of my invention is to provide, in the power plant of an automotive vehicle of the day, power means for operating a transmission mechanism comprising a change gear transmission and a two speeds forward transmission such for example as an overdrive unit, said power means including common controls comprising a vehicle speed responsive governor and the accelerator of the vehicle.

A further object of my invention is to provide power means for operating the change gear transmission mechanism of an automotive vehicle, said mechanism including the combination of a standard type of three speeds forward and reverse transmission unit and a standard type of overdrive unit; and another object of my invention is to include in said power means, means, comprising a governor operated switch unit, for effecting a succession of upshift and downshift operations of the transmission mechanism; and a further object of my invention is to include in the aforementioned transmission operating mechanism, electrical means operative to hold the throttle of the vehicle closed as the mechanism is operating to change the setting of the transmission mechanism.

The above and other objects and features of the invention will appear more fully hereinafter from a consideration of the following description taken in connection with the accompanying drawings wherein two embodiments of the invention are illustrated by way of example.

Figure 1:
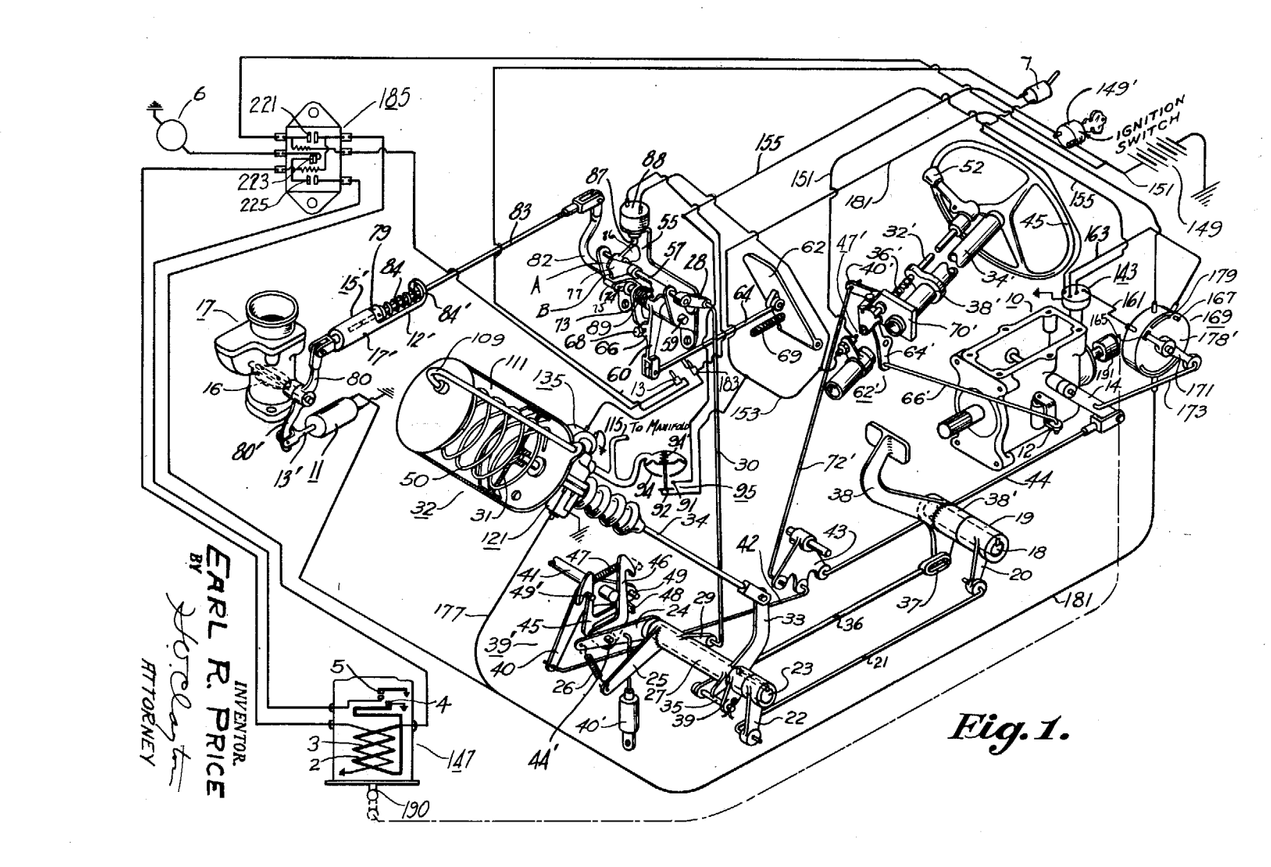
Figure 1 is a diagrammatic view of a preferred embodiment of my invention disclosing the principal features thereof.

Referring now to Figure 1 disclosing a preferred embodiment of my invention, a change gear transmission 10, preferably a three speeds forward and reverse transmission of conventional design, is operated by means of a manually operated crank 12 and a manually and power operated crank 14, the crank 12 serving to operate the shift rail selecting mechanism of the transmission and the crank 14 serving to operate that part of the transmission functioning to move the selected rail to establish the transmission in the desired gear ratio. With such a transmission the crank 14 must be moved to its transmission neutral position to neutralize the transmission before the shift rail selecting crank 12 may operated. The preferred embodiment of my invention also includes an overdrive mechanism of the day said mechanism being described hereinafter. No claim is made to either the transmission 10 per se or to the overdrive mechanism per se.

My invention has to do with the manually and power operated means for actuating and controlling the actuation of the aforementioned transmission operating cranks 12 and 14, for controlling the operation of the aforementioned overdrive mechanism, for operating the engine throttle valve 16 of the carburetor 17, and for operating a conventional friction clutch, not shown, said clutch including the usual driving and driven plates forced into engagement by clutch springs. The aforementioned transmission, overdrive mechanism, and clutch, as well as the hereinafter referred to fluid coupling, are of conventional design, accordingly, no claim is made thereto and the same are not disclosed in detail in the drawings. The mechanism of my invention also preferably includes, in the power plant of the vehicle, a fluid coupling such for example as that which was incorporated in several 1941 and 1942 passenger vehicles and said coupling includes an impeller and a vaned rotor the latter serving to drive the aforementioned driving plate of the clutch.

The friction clutch, not shown, is operably connected to a clutch throw out shaft 18 to which is keyed a sleeve 19; and to a crank 20, fixed secured to said sleeve, there is pivotally connected a rod 21. The rod 21 is pivotally connected to crank 22 which is keyed to a shaft 23 and upon one end of the latter shaft there is rotatably mounted a crank 24. The latter crank is yieldingly connected to a crank 25 by means of a spring 26; and to the crank 25 there is connected a sleeve 27 rotatably mounted on the shaft 23. The sleeve 27 is operably connected to a crank 28 by means of a crank 29 fixedly secured to said sleeve, and a rod 30 which is pivotally connected to the cranks 28 and 29.

The sleeve 27 is operably connected to a piston 31 of a pressure differential operated motor 32, by means of a two-armed crank 33 fixedly connected to said sleeve and by means of a rod 34 pivotally connected at one of its ends to the longer arm of the crank 33 and secured at its other end to the piston. The shorter of the two arms of the crank 33 abuts a pin 35 which is mounted, at one of its ends, in one end of a rod 36 said rod being connected at its other end, by a lost motion connection 37, to a manually operable clutch pedal 38. This pedal, constructed as a two-armed crank member, is rotatably mounted on the shaft 18 and is fixedly secured to a sleeve 38' which is also rotatably mounted on said shaft. The other end of the pin 35 is pivotally connected to a crank 39 which is keyed to the shaft 23.

There is thus provided manually and power operated means for operating the clutch, the clutch pedal 38, by virtue of the operation of the lost motion connection 37, remaining stationary when the motor 32 is energized to disengage the clutch.

Describing now the connection between the motor 32 and the transmission operated crank 14, as is described above the piston 31 of said motor is operably connected to the crank 24 said connection being yieldable by virtue of the operation of the spring 26; and said crank 24 is connected to the transmission operating crank 14 by means of an alternator, that is direction changing mechanism, indicated as a whole in Figure 1 by the reference numeral 39'. This alternator preferably comprises a bell crank lever 40 pivotally mounted upon a support shaft 41; and one arm of said lever is pivotally connected, by a rod 42, to one of the arms of a three-armed crank 43. Another of the arms of the latter crank is connected to the transmission operating crank 14 by means of a rod 44. Two juxtaposed claw members 45 and 46 are pivotally connected, at their lower ends, to a pin 44' which extends through the crank 24; and the claw member 46 is biased, by a compression spring 47, into engagement with one end of a stop member 48 extending from and secured to the claw member 45. A pin 49, adapted to nest within the hooked end of the claw 46, is fixedly mounted on the end of the lever 40.

Describing the operation of the alternator 39', when the motor 32 is energized the piston 31 moves upwardly, Figure 1, thereby effecting a counterclockwise rotation of the crank 25. The first increment of movement of the piston serves to disengage the clutch and control the operation of the throttle, the latter operation being described hereinafter, and during this operation the spring 26 is expanded there being no movement of the crank 24 until the clutch plates have been separated, that is until the driving torque of the power plant has been reversed. After the clutch plates are separated the expanded, that is, cocked spring 26 then serves to rotate the crank 24 counterclockwise thereby bodily moving the claws 45 and 46 downwardly as a unit; and this operation serves to rotate the bell crank lever 40 in a counterclockwise direction the hooked end of the claw 45 effecting this operation by virtue of its contact with a pin 49' mounted in one arm of said bell crank lever. This downward movement of the crank 24 to effect an operation of the transmission is preferably cushioned by the operation of a dash pot 40'; and it is also to be noted that as the pin 49 and the end of the claw 46 simultaneously move toward each other that the pin 49 rides upon the outer face of said claw to the dotted line position disclosed in Figure 1, the spring 47 being compressed during said operation to move the claw 46 away from the stop 48.

Now it will be apparent that this counterclockwise rotation of the lever 40 serves to place the rod 42 in compression to rotate the crank 43 counterclockwise thereby placing the rod 44 in compression and rotating the transmission operating crank 14 to establish the transmission in a new setting; and it is to be added that when the crank 24 is moved toward the crank 25 by the contracting operation of the spring 26, that the two cranks are then being rotated as a unit by the continued upward movement of the motor piston 31 as it moves to its upper end position in the motor 32.

Continuing the description of the operation of the alternator 39' when the motor 32 is de-energized, an operation which is initiated as the operation of the transmission is being completed, a return spring 50 within the motor, aided by the clutch engaging operation of the clutch springs, not shown, serves to rotate the cranks 24 and 25 clockwise as a unit, the latter crank contacting the pin 44'; and this operation serves to move the claws 45 and 46 upwardly as a unit the spring 47 functioning to rotate the claw 46 clockwise after the end of said claw has cleared the pin 49. The latter pin is then nested within the hook-shaped end of the claw 46. It is apparent therefore that when this preselecting operation of the alternator is completed the parts are in position to effect a clockwise rotation of the lever 40 when the motor 32 is again energized. There is thus provided by the alternator 39' a direction changing mechanism to alternately effect a clockwise and a counterclockwise rotation of the transmission operating crank 14 by the energization of the motor 32.

Describing now that part of the mechanism of my invention which is actuated by a manually operated gear shift lever 52, Figure 1, said mechanism includes a rotatable and bodily movable shaft 32' extending alongside the steering column 34' of the vehicle. As is disclosed in Figures 1, 3 and 4, the shaft 32' is biased downwardly by a spring 36' positioned between a stop 38' mounted on the steering column and a crank member 40' which is operably connected to said shaft by means of a clutch mechanism 42' described hereinafter. The shift lever 52 mounted beneath the steering wheel 45 is so connected to the shaft 32' that a rotation of said lever in a plane parallel to said wheel effects a rotation of said shaft about its longitudinal axis in the operation of either neutralizing the transmission or establishing the same in a gear setting; and this connection between the shift lever and shaft 32' is also such that the cross-shift movement of the shift lever, that is, the movement in a plane perpendicular to the plane of the steering column, results in a movement of the shaft 32' to either effect a shift rail selecting operation of the crank 12 or effect a declutching operation of the clutch 42' and a closing of a selector switch 47 to prepare the mechanism for its power operation.

Describing the aforementioned clutch mechanism 42', said mechanism includes a member 44' sleeved over the lower end of the shaft 32', said member being permanently secured in place to the crank 40'. The lower end portion of the member 44' is provided with a flange 46' which is recessed at 48', Figure 5, to provide a keyway for a key portion 50' of a spool-shaped end portion of a clutch member 52', said member being sleeved over and drivably connected by splines 54' to the end portion 56' of the shaft 32'. A nut 58', threaded on the end of the shaft portion 56', serves as a stop for the clutch mechanism which is biased downwardly by the operation of the spring 36'.

The upper arm 60' of a bell crank lever 62' fits within the spool-shaped portion of the clutch member 52' and the lower arm 64' of said lever is pivotally connected, by a link 66', to the shift rail selecting crank 12. As is disclosed in Figure 3, the spring 36' serves to bias the clutch 42' and shaft 32' as a unit downwardly, the movement being limited by a stop 68', Figure 4, constituting a part of a steering column mounted bracket member 70'; and in this position of the clutch 42' the shift rail selector crank 12 is actuated to prepare the transmission for either a second gear or high gear operation, said operation of course depending upon the subsequent actuation of the shift rail operating crank 14. To actuate the crank 12 to prepare the transmission for either a low gear or reverse gear operation, that is a selection of the low and reverse gear shift rail of the transmission, the driver lifts the shift lever 52 upwardly in a plane perpendicular to the plane of the steering wheel; and this operation serves to rotate the bell crank lever 62' in a counterclockwise direction, Figure 3, the spring 36' being compressed and the flange 46', Figure 4, being moved into engagement with the stop 68'. To actuate the shift rail operating crank 14 to neutralize the transmission or establish the same in any one of its four gear ratio settings, the driver rotates the shift lever 52 in a plane parallel to the plane of the steering wheel thereby effecting an angular movement of the crank 40' which is preferably connected to the crank 14 by force transmitting means including link 72', the aforementioned three-armed lever 43 and the link 44.

There is thus provided, by the above described mechanism, means for manually operating a three speeds forward and reverse transmission; and in this manual operation of the transmission the shift lever 52 is movable to six different positions, said selective movement outlining the letter H.

Referring now to Figure 1, there is disclosed therein details of certain other controls of the mechanism of my invention. A bracket 55 serves as a mounting for a shaft 57 and a shaft 59 said shafts being journalled in the sides of said bracket. The shaft 59 is operably connected to the throttle valve 16 by a crank 82, a crank 80, a link 83 and an electromagnetically operated throttle closing mechanism including a lost motion connection 15'. This throttle closing mechanism includes a grounded solenoid 11 electrically connected to the conductor 177 by a conductor; and the armature, not shown, of this solenoid is connected to a throttle operating crank 80' by a link 13'. The crank 80' is operably connected to the link 83 by the connection 15' which includes a member 17' pivotally secured at one of its ends to said crank and bored to slidably receive one end of the rod 83. A spring 84, sleeved over the rod 83, is interposed between a stop 79 secured to the rod 83, and a flange member 84' of a support member 12' extending from the member 17'. There is thus provided power operated means for maintaining the throttle 16 closed despite a depression of the accelerator. The operation of this mechanism and its cooperation with the other elements of my invention will be described in greater detail hereinafter.

A crank 60, rotatably mounted on the shaft 59 and operably connected to the accelerator 62 of the car by a link 64, is provided with a laterally extending flange 66 within which is adjustably mounted stop member 68. This stop member is biased, by the operation of a spring 89 and an accelerator return spring 69, into engagement with a flange member extending laterally from a fitting 73 fixedly secured to the shaft 59; and from the fitting 73 there extends a flange 74 which is provided at its end with a roller member 75. This roller member is adapted to contact a cam 77 which is fixedly mounted on the shaft 57; and mounted alongside the cam 77 there is provided a cam 86 which is also secured to the shaft 57. The cam 86 contacts a pin 87 extending from the movable contact, not shown, of a breaker switch 88; and this contact is biased, by a spring, not shown, to its switch open position and is moved to its switch closed position by the cam 86 which is shaped to effect a closing of the switch during a part of the clutch engaging movement of the motor piston 31. There is provided, by the switch 88 and the cam means for operating the same, means for controlling the operation of a choke valve operating solenoid 135, Figure 5, to effect a controlled clutch engaging operation of the motor 32. The parts, including the contour of the face of the cam 86, are preferably so constructed and arranged and so operative that the solenoid 135 is energized, to move a valve member 131 away from a seat 137, during the clutch engaging movement of the piston 31 said operation being effected just as the piston reaches the point of clutch plate contact; and as stated above the parts are also so constructed and arranged and so operative that the switch 88 is subsequently opened, to effect a de-energization of the solenoid 135, during said clutch engaging movement of said piston. When the valve 131 is moved off of a seat 139, Figure 7, air rushes into the motor 32 at a relatively high rate to thereby effect a relatively rapid clutch engaging movement of the clutch driven plate, and when the valve 131 is seated air flows into the motor 32 via a relatively small opening 10'. The solenoid 135 and valve means for controlling the operation of the motor 32, are described in greater detail hereinafter.

Continuing the description of the mechanism disclosed in Figure 1, the spring 89 is sleeved over the hub of the crank 60 and is connected at one of its ends to the member 73; and the other end of said spring abuts the outer face of the flange 66 on said crank. There is thus provided, by the unit 15' and the spring 89 and cooperating parts including the cam 77, means, interconnecting the accelerator and throttle whereby the accelerator may be depressed without effecting an opening of the throttle when the motor 32 is energized to successively disengage the clutch and operate the transmission; for with the first increment of clutch disengaging movement of the piston 31, the cam 77 is rotated counterclockwise, Figure 1, thereby providing, by its end portion A, a stop to prevent a clockwise rotation, that is throttle opening movement, of the accelerator operated flange 74. It is to be noted at this juncture that when the accelerator is depressed to cock the spring 89 and the motor 32 is de-energized to effect a reengagement of the clutch the cam 77 is rotated clockwise, Figure 1, to effect a controlled opening of the throttle as the clutch plates move into contact with each other, a segment B of said cam being shaped to effect this operation. Preferably all points along the segment A of the cam 77 are equally distant from the center of rotation of said cam; and the radius of the cam portion B progressively decreases to effect the above described control of the throttle. There is provided, by the operation of the sector A of the cam 77, a stop means operative to prevent an opening of the throttle when the clutch is being disengaged and during the engagement of the clutch as the driven clutch plate moves up to a point just short of engagement with the driving clutch plate; and the subsequent operation of the segment B of said cam serves to make possible a progressively increased opening of the throttle, by the operation of the accelerator loaded spring 89, as the clutch plates move into driving engagement with each other. The electromagnetically operated throttle controlling unit 11 serves to supplement the operation of the portion A of the cam 77, that is, the operation of maintaining the throttle closed as the clutch is being disengaged and the transmission operated.

Figures 6, 7, 8:
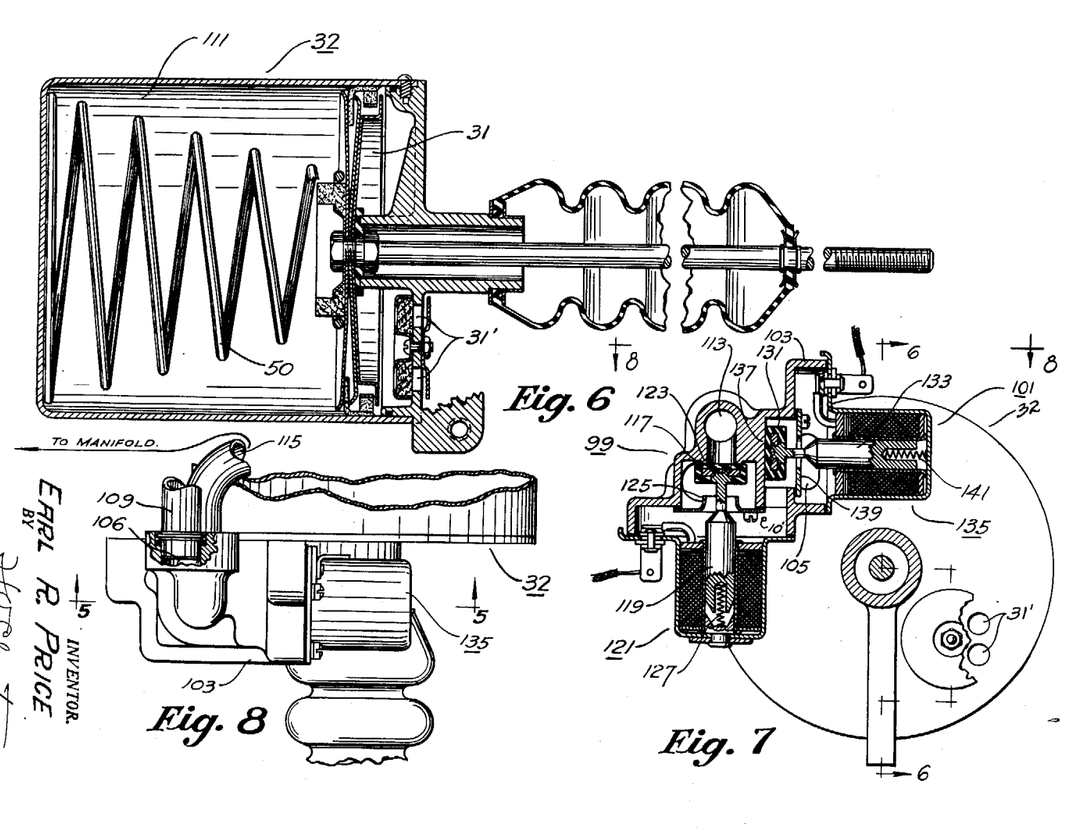
Figure 6 is a sectional view, taken on the line 6—6 of Figure 7, disclosing details of the pressure differential operated motor of my invention.
Figure 7 is a view, largely in section, disclosing details of the solenoid operated valves for controlling the operation of the motor unit of Figure 6.
Figure 8 is a view, partly in section, taken on the line 8—8 of Figure 7, disclosing details of the air transmitting ducts constituting part of the motor unit disclosed in Figures 7 and 8.

The valve means for controlling the operation of the motor 32 is disclosed in detail in Figure 7 and includes a three way valve unit 99 and a choke valve unit 101. Both units are housed within a casing 103 preferably mounted on the casing of the motor 32. The casing 103 is preferably ported at 105 to provide a vent to the atmosphere, at 106 to receive a duct 109 leading to a control compartment 111 of the motor, and at 113 to receive a conduit 115 leading to the intake manifold of the internal combustion engine of the vehicle or other source of vacuum. The three way valve unit 99 includes a valve member 117 operably connected to the armature 119 of a solenoid 121 which is secured to the casing 103. When the solenoid 121 is energized the valve member 117 is moved downwardly, Figure 7, to leave a seat 123 and abut a seat 125; and when said solenoid is de-energized a spring 127 serves to return the valve member to its seat 123. The choke valve unit 101 includes the aforementioned valve member 131 which is operably connected to the armature 133 of a solenoid 135 secured to the valve casing 103. As previously briefly described, when the solenoid 135 is energized the valve member 131 is moved off of a seat 137 onto a seat 139; and when the solenoid 135 is de-energized a spring 141 serves to return the valve member 131 to its seat 137.

Figure 2:
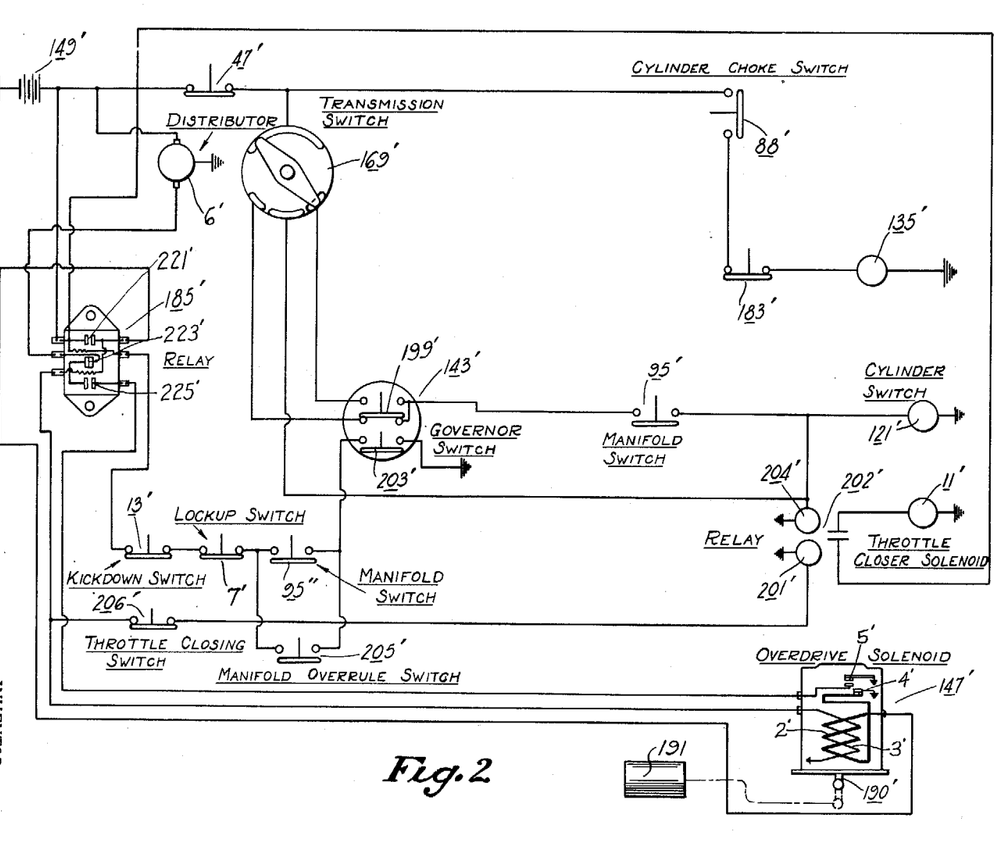
Figure 2 is a view disclosing the electrical hookup of another embodiment of my invention.

The electrical means for controlling the operation of the solenoids 121 and 135 constitutes a feature of my invention said electrical means being disclosed in Figure 1. Describing this control means the movable contact of a single pole double throw switch of a two-stage governor operated switch mechanism 143, and indicated by the reference numeral 199 in Figure 2, is electrically connected in series with a manifold vacuum operated switch 95, the manually operated selector switch 47' and a grounded battery 149. The governor operated switch mechanism 143, including a vehicle speed responsive governor, not shown, is diagrammatically disclosed in the embodiment of my invention disclosed in Figure 2 said embodiment being described hereinafter. No claim is made to this well known switch mechanism accordingly the same is not disclosed in detail. Referring to Figure 1 the wiring interconnecting said switches and battery preferably includes an electrical conductor 151 interconnecting the battery 149 with the selector switch 47', a conductor 153 interconnecting the latter switch with the movable contact of the manifold vacuum operated switch 95, and a wire 155 interconnecting the fixed contact of the latter switch with the aforementioned movable contact of the governor operated switch 143. The latter switch includes fixed contacts which are connected respectively by wires 161 and 163 to fixed contacts 165 and 167 of a power operated selector switch mechanism 169 connected to the transmission operating crank 14. A movable contact 171 of the latter switch mechanism is operable as a crank and is pivotally mounted at its center upon a pin 177' extending from a switch box 178'; and to one end of the member 171 there is pivotally connected a link 173 which is pivotally connected to the transmission operating crank 14. The movable contact 171 is electrically connected to the solenoid 121 by a contact 175 and a conductor 177 connected to said member. A contact 179 of the switch 169 is electrically connected to the conductor 153 by a conductor 181; and it is important to note that the conductor 153 serves to electrically interconnect the switches 47 and 95 accordingly the contact 179 is electrically connected to the circuit interconnecting the switch 95 and battery at a point which lies between said switch and battery. The contacts 165 and 171, contacts 171 and 179 and the contacts 167 and 171 of the switch mechanism 169 provide three separate switches; and the movable contact 171 is so connected with the transmission operating crank 14 and said mechanism is so constructed that the switch 167, 171 is closed when the transmission is established in its second gear setting, the switch 165, 171 is closed when the transmission is established in its high gear setting, and the switch 171, 179 is closed during the vacuum operation of the motor 32. In other words, the switch 171, 179 is closed at all times, except when the transmission is completely or substantially completely established in either its second gear setting or its high gear setting.

Describing more completely the vacuum operated switch 95 this switch comprises a fixed contact 91 and a movable contact 92, the latter being actuated by an intake manifold vacuum operated motor 94 comprising a power element which is operably connected to said movable contact. The latter contact is biased to its switch open position by a spring 94'. Describing the operation of the switch 95, when the accelerator is released to close the throttle valve 16, there is effected a substantial degree of intake manifold vacuum; accordingly, it follows that with this operation the motor 94 is energized to close the switch 95; and when the throttle valve is opened sufficiently to destroy or substantially destroy the intake manifold vacuum then the motor 94 is automatically de-energized and the spring 94' is then operative to open the switch 95. The degree of manifold vacuum is also controlled in part by the speed of operation that is R. P. M. of the internal combustion engine of the vehicle. It follows therefore that the operation of the motor 94, which in turn operates the switch 95, is dependent upon both the position of the throttle valve and the speed of the engine.

Completing the description of the electrical control means of Figure 1 the grounded choke valve controlling solenoid 135 is wired in series with an accelerator operated switch 183, the switch 88, the switch 47' and the grounded battery 149. The switch 183 is closed when the accelerator is released.

Describing now the most important feature of my invention, that is, the combination of the transmission operating mechanism 10 with a two speeds forward transmission such as the aforementioned overdrive unit 191, there is diagrammatically disclosed in Figures 1 and 2, one of the overdrive mechanisms of the day the particular mechanism disclosed being that incorporated in a well known automotive vehicle.

This overdrive mechanism 191, which is incorporated in the power plant between the aforementioned three speeds forward and reverse transmission and the differential of the car, is actuated by an overdrive solenoid motor unit indicated, in Figure 1, by the reference numeral 147, said unit including a spring and solenoid operated pawl 190. This pawl is moved to the dotted line, that is overdrive position, Figure 1, by a pull-in coil 2 within the unit 147 and is held in this position by a hold-in coil 3 within said unit. The coil 2 is controlled in part by a switch 4 and the coil 3 by a switch 225 of a time-delay relay 185 and when the overdrive cut-in speed is reached both coils are energized to effect the overdrive setting of the pawl. In this operation the pawl is engaged in a sun gear plate, not shown, of the overdrive mechanism and as said operation is being completed the switch 4 is opened; however, the electrical circuit including the hold-in coil 3 remains closed to maintain the energization of said coil. When the hold-in coil of the unit is de-energized the pawl 190 is moved by a spring, not shown, within the unit to withdraw the pawl from a sun gear plate causing the car to free wheel; and this position of the pawl is disclosed in full lines in Figure 1. The sun gear plate constitutes a part of the overdrive transmission unit, said unit cooperating with the three speeds forward and reverse transmission 10 to provide, for all normal driving of the car, a four speeds forward and reverse transmission mechanism. The switch 4 and an ignition controlling kickdown circuit of the mechanism are controlled by the time delay relay 185 which is in turn controlled by series connected switches 7, 13 and a grounded single pole single throw switch of the switch mechanism 143. The latter switch, indicated by the reference numeral 203' in Figure 2, is preferably made above a vehicle speed of say, 25 M. P. H. The switch 7 constitutes a normally closed lockout switch for disabling the overdrive mechanism at the will of the driver; and the switch 13 constitutes a normally closed kickdown switch which is opened by the accelerator when the latter is depressed slightly beyond its full throttle open position.

The relay 185 has two sets of contacts. One set, indicated by the reference numeral 221, is normally opened and controls the circuit including the pull-in coil 2 and its control switch 4. The other set of contacts, located in the center of the relay mechanism and indicated by the reference numeral 223, is in the aforementioned ignition controlling circuit; and this circuit includes a switch 5 within the motor unit 147 said switch being closed when said unit is energized, that is when the hold-in coil 3 is energized. The relay also includes the aforementioned normally opened contacts 225 which are located in the ignition grounding circuit between the distributor 6 of the ignition system of the vehicle and the switch 5 of the motor unit 147. When the transmission mechanism 191 is in its overdrive setting the contacts 221 and 225 are closed and the center contacts 223 are open. When the throttle switch 13 is opened, by a kick-down operation of the accelerator pedal, the relay 185 is de-energized, opening the contacts 221 and de-energizing the motor 147. This action also closes the center contacts thereby grounding the distributor. After a fraction of a second the bottom contacts 225 will open thereby breaking the grounding circuit.

Briefly describing the operation of the overdrive mechanism, with the switches 7 and 13 closed and the vehicle speed increased beyond the aforementioned critical speed of 25 M. P. H., the relay 185 is operated by a closing of the contacts 221 thereby effecting the overdrive operation of the unit 147. In this operation the pawl 190 is moved to effect the overdrive setting of the transmission said operation being initiated immediately after but not until the accelerator of the car is released to reverse the driving torque of the internal combustion engine.

To effect the downshift or oft called kickdown operation of the overdrive mechanism the driver may either open the lockout switch 7 mounted on the dash board of the vehicle; or he may, as stated above, depress the accelerator far enough to open the kickdown switch 13. And it is also to be noted that this downshaft operation is automatically effected by an opening of the single pole single throw switch of the switch mechanism 143 when the car speed drops to the aforementioned 25 M. P. H. critical speed. The downshift operation is as stated above, facilitated by a momentary disabling of the ignition system of the vehicle said operation being effected by momentary grounding of the distributor 6 of said system; and this operation of the ignition system constitutes a reversal of torque of the internal combustion engine equivalent in effect to the torque reversal of the engine effected by a release of the accelerator or a closure of the throttle by the throttle closing solenoid 11. A switch 5 within the motor 147 constitutes a part of the mechanism for effecting this momentary grounding operation.

Describing now the complete operation of the mechanism of my invention, and incidentally completing the description of the parts of said mechanism not heretofore described, it will be assumed that the three speeds forward and reverse transmission 10 is neutralized and that the car is at a standstill with the engine idling, thereby making of the intake manifold of said engine a source of vacuum. The driver will then probably wish to establish the transmission in its low gear setting whereupon he will first manually depress the clutch pedal 38 to disengage the clutch and will then operate the shift lever 52 to manually effect said setting. The accelerator will then be depressed as the clutch is re-engaged to get the car under way; and after the desired car speed is reached, the shift lever and clutch pedal are again operated to establish the transmission in its second gear setting. The car being then under way in second gear at the desired speed, the driver will probably wish to be relieved of the operation of the transmission and clutch; accordingly, to effect this result he will manually disengage the clutch and then move the shift lever to its automatic position, that is, one of the six selective positions of said lever. Describing the latter operation the shift lever 52, which at the time is in its second gear setting, is rotated downwardly, that is, angularly in a clockwise direction in a plane perpendicular to the plane of the steering wheel; and this operation serves to bodily move the shaft 32 downwardly until a movable contact member 224, Figure 3, of the selector switch 47 is in contact with a fixed contact of said switch to close the same. This operation constitutes a declutching operation of the clutch mechanism 42', the clutch member 52' moving away from the clutch member 44' the movement of the latter being prevented by the stop 68'.

Figure 3:
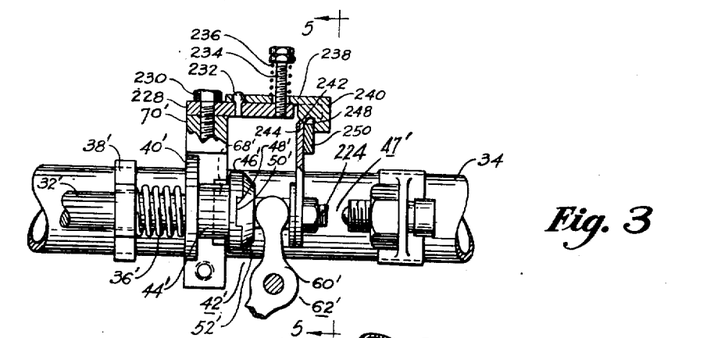
Figure 3 is an enlarged view of the mechanism at the base of the steering column of the embodiment of my invention disclosed in Figure 1, said mechanism being also incorporated in the embodiment disclosed in Figure 2.
Figure 4:
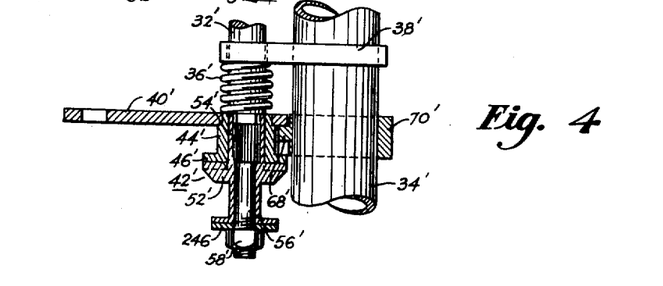
Figure 4 is a sectional view, taken on the line 4—4 of Figure 5, disclosing certain features of the mechanism disclosed in Figure 5.
Figure 5:
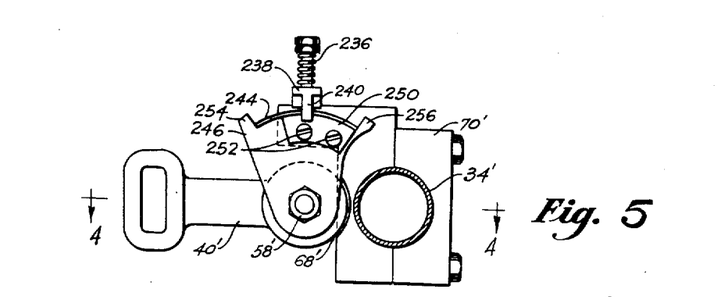
Figure 5 is a front view, taken on the line 5—5 of Figure 3 of the mechanism disclosed in Figure 3.

Referring to Figures 3 and 5 there is disclosed a latch mechanism for holding the shift lever in its automatic position, said mechanism including a relatively narrow rectangular shaped support member 228 preferably detachably secured to the bracket member 70' by a bolt 230; and there is mounted on said support member, by means of a guide pin 232, a bolt 234 and a spring 236, a movable latch member 238 shaped at its outer end to provide a relatively narrow stop member 240. Now when the shift lever 52 is moved to its automatic position a relatively narrow wedge-shaped flange portion 242 of the member 238 is rocked and/or bodily lifted, against the tension of the spring 236, by the camming action of a wedge-shaped peripheral edge portion 244 of a stop member 246 which is secured to the pin 56', Figure 4, between the lower flange portion of the clutch member 52' and the nut 58'; and this operation serves to position said peripheral edge portion 244 in the space indicated by the reference numeral 248, Figure 3. Incidentally the shift rail selecting mechanism of the transmission and the cooperating transmission parts are so constructed that the crank 62' may be moved beyond its second and high shift rail selective position in effecting the above described automatic setting of the shift lever.

Now at this juncture it is to be noted, from an inspection of Figure 5, that a rectangular shaped stop member 250, secured to the outer face of the stop member 246 by screws 252, is in contact with the member 240 when the parts are in their transmission neutral position and when the spring 36' has operated to move the crank 12 to its second and high shift rail position, that is, the position preparing the transmission for either second or high gear operation. It follows therefore that the stop member 246 must be rotated clockwise in Figure 5 so that the member 250 will clear the member 240 before the shift lever may be moved downwardly to its automatic position, that is, the position to close the switch 47; and it becomes apparent from the above description that the parts of the mechanism are so constructed and arranged that this automatic setting of the shift lever may only be effected after said shift lever has been moved to establish the transmission in its second gear setting. Referring to Figure 5 of the drawings in this position of the parts, that is the second gear setting, a stop 254 on the member 246 will contact the side of the members 228 and 238 and the stop member 250 will be positioned to the right of the member 240. Completing the description of the member 246 a stop 256 is provided thereon to contact one side of the members 228 and 238 when the shift lever is moved to either its low or high gear position.

Continuing the description of the operation of the mechanism the driver having moved the shift lever to its automatic position and assuming that the car reaches governor speed, say 12 M. P. H., to effect a first stage operation of the switch 143, the transmission 10 will then be automatically established in its high gear setting when the intake manifold vacuum reaches a certain factor; for at this manifold vacuum the motor 94 is energized to close the switch 95. With this operation an electrical circuit is completed via the grounded battery 149, an ignition switch 149', the then closed selector switch 47, the then closed manifold vacuum operated switch 95, the switch 143, the switch 167, 171 of the switch mechanism 169, and the grounded solenoid 121; and with this operation an electrical circuit is also completed to energize the solenoid 11 to close the throttle. The resulting operation of the three way valve 99, Figure 7, effects an energization of the motor 32 the piston 31 of said motor being then subjected to a differential of pressures to move the same to the left, Figure 1. The right side of the piston 31 is at all times subjected to the pressure of the atmosphere via screened openings 31' in one end of the motor 32; and the left side of said piston, that is, the side constituting a wall of the compartment 111, is subjected to a relatively low gaseous pressure when the three way valve 99 is opened to interconnect said compartment with the intake manifold or other source of vacuum. When the latter valve is closed, that is, when the solenoid 121 is de-energized, the compartment 111 is vented to the atmosphere through said valve and the spring 50 within said compartment is then operative to move the piston 31 to the right, Figure 1, to permit a reengagement of the friction clutch by the operation of its springs.

Describing now the clutch disengaging, transmission operating and throttle controlling operation of the motor 32 the above referred to leftward movement of the piston 31 serves, during the first increment or movement of the piston, to rotate the crank 20 to disengage the clutch and rotate the cam 77 counterclockwise to bring the stop portion A of said cam opposite the accelerator operated crank 74; and as this operation is being effected the spring 26 is expanded inasmuch as the rod 44 cannot be moved to operate the transmission until after the driving torque is reversed, that is, until after the clutch is disengaged. Now immediately after the clutch plates are moved out of contact with each other to reverse the driving torque, the above described force transmitting means interconnecting the spring loaded crank 24 and the crank 14 becomes operative to move the latter crank and establish the transmission in its high gear setting; and as this operation of the transmission is being completed the transmission switch 169 is operated to make the switch 165, 171 and to break the switch 171, 179. The switch 167, 171 is broken during the first increment of movement of the piston 31; and the switch 171, 179 and its connection with the circuit between the switch 95 and the battery insures a completion of the high gear transmission operating operation of the motor 32 once initiated. The switch 171, 179 is broken when the high gear operation of the transmission is completed and as described above the breaking of this switch results in a de-energization of the solenoids 121 and 11; and with the switch 183 closed this results in a de-energization of the motor 32 to initiate a controlled re-engagement of the clutch and a preselected operation of the alternator 39'; and the opening of the throttle is controlled by the cam 77 if the accelerator is depressed before or during the engagement of the clutch.

The transmission will now remain in its high gear setting until the car is slowed down to a governor speed of say 11 M. P. H. and the accelerator is released to energize the motor whereupon the throttle will be closed and the motor 32 will again be energized to establish the transmission in its second gear setting, the clutch being disengaged to facilitate said operation. If the car is then brought to a stop without neutralizing the transmission, that is, leaving the shift lever in its automatic setting, the operation of the fluid coupling of the power plant will obviate a stalling of the engine despite the relatively high gear ratio setting of the transmission and despite the fact that the idling engine is at the time directly connected to the then stationary propeller shaft of the vehicle.

As to the operation of the overdrive mechanism of my invention the third gear overdrive setting of the transmission is established upon release of the accelerator provided the car is travelling at or above a speed sufficient to effect the second stage operation of the governor switch 143; and the aforementioned conventional that is third gear setting of the transmission is re-established when the car is subsequently slowed down below this critical speed or when either the switch 13 or the switch 7 is opened. As suggested above the governor switch mechanism 143 may be adjusted to effect the second stage operation of the mechanism 143 when the car is travelling at or above a speed of 25 M. P. H.

There is thus provided a simple and effective manually and power operated mechanism for operating the transmission, clutch and throttle of an automotive vehicle; and the clutch pedal, the shift lever and the accelerator constitute the only manually operated controls of said mechanism. With the mechanism of my invention the driver may manually operate the clutch and the three speeds forward and reverse transmission in a conventional manner, that is, by operating the clutch pedal and by effecting the H movement of the shift lever; then if he desires an automatic speed and manifold vacuum controlled operation of the transmission to successively establish the same in its second gear setting, its third gear setting, and its third gear overdrive setting he has only to move the shift lever from its second gear setting to its automatic setting. Thereafter for all normal straight ahead driving of the vehicle the driver need only operate the accelerator; and it is to be noted that with the inclusion of the manifold vacuum operated switch 95 in the mechanism it is not necessary to completely release the accelerator to initiate the cycle of operations of the clutch, throttle and transmission 10.

Briefly reviewing the operation of the mechanism of Figure 1, to effect the shuttling operation of the transmission 10 between its second and third gear settings it will be assumed that the transmission is established in second gear; then when the car is speeded up to the low stage governor speed of 12 M. P. H. and the controls are operated to effect a closure of the switch 95, the motor 32 is energized to disengage the clutch and simultaneously operate the cam 86 as a stop to prevent an opening of the throttle, and then operate the transmission to establish the same in its third gear setting. The solenoid 11 is at this time energized to supplement the operation of the cam 77 in maintaining the throttle closed; and it is to be noted that the closure of the throttle by the solenoid 11 slows down the speed of the engine and increases the manifold vacuum thereby facilitating the operation of the mechanism. As the third or oft-called high gear operation of the transmission is being completed the motor is de-energized to thereby initiate a stage clutch engaging operation of said motor said operation being effected when the accelerator is released to close the switch 183. As the clutch engaging operation of the motor 32 is being effected the alternator 39' is operated to prepare the mechanism for a subsequent second gear operation of the transmission. The cycle of operations of the mechanism to effect the latter operation of the transmission duplicates the above described operation; accordingly, a description of said operations will not be repeated here. It is to be particularly noted that with a normal operation of the car, the cycle of clutch and transmission operating and throttle controlling operations of the motor is completed once initiated and despite an opening of the switch 95 during said cycle of operations.

There is diagrammatically disclosed in Figure 2 another embodiment of my invention said embodiment improving upon the embodiment of my invention disclosed in Figure 1 by the addition of a manifold vacuum controlled electrical mechanism, including a manifold vacuum operated switch and a relay controlled throttle closing solenoid, for controlling the operation of the overdrive unit and for effecting a closure of the throttle to facilitate said operation. The mechanism of Figure 2 provides a five speeds forward and reverse transmission. Parts of the mechanism of Figure 2 which duplicate like parts in the mechanism of Figure 1 are given the same reference numerals with the addition of a prime.

Referring to the governor switch mechanism 143' of Figure 2, a duplicate in construction of the switch 143 of Figure 1, the single pole single throw switch 203' thereof is preferably adjusted to close at a vehicle speed above 10 M. P. H.; and a single pole double throw switch 199' is preferably adjusted to close at say, 22 M. P. H. to effect the second gear setting of the transmission 10 and at 25 M. P. H. to effect the third gear setting of said transmission.

Now it is to be noted that with the mechanism of Figure 1 the accelerator need not be completely released to make possible the third gear overdrive operation of the overdrive unit 191. Likewise with the mechanism of Figure 2, it is unnecessary to completely release the accelerator to effect the two overdrive operations of the unit 191'. With the latter mechanism for example a partial release of the accelerator will, at a certain engine speed result in the operation of a manifold vacuum operated motor 94' to operate a switch 95' and a switch 95'', both of said switches being operated by said motor. Assuming the switches 203', 7' and 13' of the mechanism of Figure 2 to be closed, a relay 185' will then be operated to effect the overdrive operation of the solenoid unit 147'. Now as will be noted from an inspection of the latter figure this operation of the relay 185' will complete an electrical circuit including a grounded coil 201' of a single pole single throw double coil relay 202'. A solenoid 11' will then be energized to close the engine throttle to facilitate the operation of establishing the transmission mechanism in its second gear overdrive setting. An increase in the speed of the vehicle to 25 M. P. H. and a closure of the switch 95' will then result in the automatic operation of the mechanism to effect a third gear overdrive setting of the transmission; and with this operation a solenoid 204' of the relay 202' is energized to effect a throttle closing operation of the solenoid 11'.

A switch 205' preferably operated by the solenoid motor 147' is preferably included in the electrical controls of the mechanism of Figure 2. This switch, which is made when the motor 147' is in its overdrive setting, is wired in parallel with the switch 95'' and serves, with the switches 7', 13' and 203' closed, to insure a maintenance of the unit 147' in its overdrive setting despite an opening of the switch 95''. There is also preferably included in the mechanism of Figure 2 a switch 206' actuated by the motor 147' which is normally made but which is broken when said unit is established in its overdrive setting. The switch 206' serves to break the electrical circuit controlling the throttle operating solenoid 11' when the operation of the latter is completed; accordingly the throttle may be opened by the accelerator after the overdrive setting of the transmission has been completed.

There is thus provided, by the transmission mechanisms of Figures 1 and 2, a simple mechanism, controlled in large measure by an operation of the accelerator and a vehicle speed responsive governor, for transmitting the power of the engine to the driving wheels of the vehicle. With a normal operation of both mechanisms the up-shift of the transmission mechanism, that is units 10 and 191 in Figure 1 and units 10' and 191' in Figure 2, is progressive in a plurality of steps; likewise, the down-shift operation of said mechanism is progressive in a plurality of steps. The mechanism of Figure 1, wherein the accelerator and governor constitute common controls of the two transmission mechanisms, is speed and intake manifold vacuum responsive to effect a shift from second gear to third gear and from third gear to second gear; and the shifts from third gear to third gear overdrive and from the latter setting to third gear are speed and torque responsive, the latter control being effected by a release of the accelerator to reverse the engine torque. With the mechanism of Figure 1 the driver may, by opening either of the switches 7 or 13, overrule the operation of the governor switch mechanism 143 by effecting a kickdown operation of the mechanism that is effect, at will a shift of the transmission from third gear overdrive to third gear.

As to the mechanism of Figure 2 the upshift operations that is second gear to second gear overdrive and second gear overdrive to third gear overdrive are speed and intake manifold vacuum responsive; and the corresponding downshift operations of the mechanism are likewise intake manifold vacuum and speed responsive; and with the mechanism of Figure 2 the driver, may, at will, overrule the governor by effecting a kickdown operation from third gear overdrive to third gear or from second gear overdrive to second gear. With the mechanism of Figure 2 the accelerator, governor and throttle closer relay mechanism 202' constitute common controls for the two transmission mechanisms, that is, the overdrive mechanism and transmission 10.

Although only two embodiments of the invention have been illustrated and described, various changes in the form and relative arrangements of the parts may be made to suit requirements.

Having thus described the various features of the invention, what I claim as new and desire to secure by Letters Patent is:

1. In an automotive vehicle provided with a power plant including an internal combustion engine having an intake manifold, an ignition system constituting a part of the means for controlling the operation of said engine, and a transmission mechanism comprising a change gear transmission and a two speeds forward transmission incorporated in the power plant to the rear of the change gear transmission; of means for controlling the operation of the transmission including a motor for operating the two speeds forward transmission, a motor for operating the change gear transmission, and means for controlling the operation of the two motors, the engine vacuum within the intake manifold, and the ignition system, to effect a succession of upshift operations of the transmission mechanism and a subsequent succession of downshift operations of said mechanism including an accelerator operated ignition controlling switch means constituting a part of the control means for effecting a downshift operation of the transmission mechanism and serving, when closed, to render the ignition system inoperative to thereby facilitate an operation of the two speeds forward transmission, an accelerator operable to control the degree of vacuum within the intake manifold, to control the motor for operating the change gear transmission, and to control said switch means, and further including a vehicle speed responsive governor and switch mechanism operated by said governor and serving as part of the control means for effecting both upshift and downshift operations of the transmission mechanism.

2. In an automotive vehicle provided with a power plant including an internal combustion engine having an intake manifold, an engine control having a butterfly valve; an ingition system, and a transmission mechanism comprising a three speeds forward and reverse transmission and a two speeds forward transmission; means for controlling the operation of said transmission mechanism including a motor for operating the two speeds forward transmission, a motor for operating the three speeds forward and reverse transmission to alternately establish the same in its second and high gear settings, and means for controlling the operation of the two motors, the engine, and the ignition system to effect a succession of upshift operations of the transmission mechanism and a subsequent succession of downshift operations of said mechanism including an accelerator operated ignition controlling switch means serving, when closed, to render the ignition system inoperative to thereby facilitate an operation of the two speeds forward transmission mechanism, an accelerator operable, through the intermediary of an operation of the butterfly valve, to control the degree of vacuum within the intake manifold and thereby control the operation of the three speeds forward and reverse transmission operating motor, and further including a vehicle speed responsive governor for controlling both motors, and switch mechanism operated by said governor.

3. Transmission mechanism and operating means therefor adapted for use in the driving mechanism of an automotive vehicle including a change gear transmission, an overdrive mechanism operably connected to the change gear transmission, a pressure differential operated motor operably connected to the change gear transmission, a solenoid motor operably connected to the overdrive mechanism, and means for controlling the operation of said motors to either selectively effect any one of a plurality of up-shift operations of the transmission mechanism or successively effect a plurality of up-shift operations of said mechanism, and to then effect a plurality of down-shift operations of the transmission mechanism, said control means including valve means for controlling the operation of the pressure differential operated motor, electrical means for controlling the operation of solenoid motor, and means for controlling the operation of the electrical means and valve means including a manually operated member operable to control the operation of both the electrical means and the valve means, and a governor mechanism also operable to control the operation of both the electrical means and the valve means.

4. Transmission mechanism and operating means therefor adapted for use in the driving mechanism of an automotive vehicle including a change gear transmission, an overdrive mechanism operably connected to the change gear transmission, a pressure differential operated motor operably connected to the change gear transmission, a solenoid motor operably connected to the overdrive mechanism, and means for controlling the operation of said motors to either selectively effect any one of a plurality of up-shift operations of the transmission mechanism or successively effect a plurality of up-shift operations of said mechanism, and to then effect a plurality of down-shift operations of the transmission mechanism, said control means including valve means for controlling the operation of the pressure differential operated motor, electrical means for controlling the operation of solenoid motor, and means for controlling the operation of the electrical means and valve means including a manually operated member operable to control the operation of both the electrical means and the valve means, a kick-down switch actuated by the manually operated member in the operation of effecting a kick-down operation of the overdrive mechanism, and a governor mechanism also operable to control the operation of both the electrical means and the valve means said governor mechanism including a single pole double throw switch constituting part of the means for controlling the operation of the pressure differential operated motor and further including a single pole single throw switch constituting part of the means for controlling the operation of the solenoid motor, and a pressure differential and spring operated switch means, controlled in part by an operation of the manually operated member and serving as part of the control means for the pressure differential operated motor.

5. Transmission mechanism and operating means therefor adapted for use in the driving mechanism of an automotive vehicle including a change gear transmission, an overdrive mechanism operably connected to the change gear transmission, a pressure differential operated motor operably connected to the change gear transmission, a solenoid motor operably connected to the overdrive mechanism; and means for controlling the operation of said motors to either selectively effect any one of a plurality of up-shift operations of the transmission mechanism or successively effect a plurality of up-shift operations of said mechanism, and to then effect a plurality of down-shift operations of the transmission mechanism, said control means including valve means for controlling the operation of the pressure differential operated motor, electrical means for controlling the operation of the solenoid motor, and means for controlling the operation of the electrical means and valve means including a manually operable member constituting a part of the control means for both the electrical means and the valve means, a governor operated switch means also constituting a part of the control means for both the electrical means and the valve means, a kick-down switch actuated by the manually operated member, connected in series with a part of the governor operated switch means and serving as part of the control for the electrical means, and a spring and pressure differential operated motor operated switch controlled in part by the manually operable member, connected in series with a part of the governor operated switch means and serving as part of the control for the valve means.

6. Transmission mechanism and operating means therefor adapted for use in the driving mechanism of an automotive vehicle including a change gear transmission, an overdrive mechanism operably connected to the change gear transmission, a pressure differential operated motor operably connected to the change gear transmission, a solenoid motor operably connected to the overdrive mechanism, and means for controlling the operation of said motors to either selectively effect any one of a plurality of up-shift operations of the transmission mechanism or successively effect a plurality of up-shift operations of said mechanism, and to then effect a plurality of down-shift operations of the transmission mechanism, said control means including valve means for controlling the operation of the pressure differential operated motor, electrical means for controlling the operation of solenoid motor, and means for controlling the operation of the electrical means and valve means including a manually operable member constituting a part of the control means for both the electrical means and the valve means, a governor operated switch means also constituting a part of the control means for both the electrical means and the valve means, a motor operated switch controlled in part by the manually operable member, connected in series with a part of the governor operated switch means and serving as part of the control for the electrical means, a kick-down switch actuated by the manually operated member, connected in series with the motor operated switch and with a part of the governor operated switch means and serving as part of the control for the electrical means, and another motor operated switch controlled in part by the manually operable member, connected in series with a part of the governor operated switch and serving as part of the control for the valve means.

7. Transmission mechanism and operating means therefor adapted for use in the driving mechanism of an automotive vehicle including a change gear transmission, an overdrive mechanism operably connected to the change gear transmission, a pressure differential operated motor operably connected to the change gear transmission, a solenoid motor operably connected to the overdrive mechanism, and means for controlling the operation of said motors to either selectively effect any one of a plurality of up-shift operations of the transmission mechanism or successively effect a plurality of up-shift operations of said mechanism, and to then effect a plurality of down-shift operations of the transmission mechanism, said control means including valve means for controlling the operation of the pressure differential operated motor, electrical means for controlling the operation of solenoid motor, and means for controlling the operation of the electrical means and valve means including a manually operable member constituting a part of the control means for both the electrical means and the valve means, a governor operated switch means also constituting a part of the control means for both the electrical means and the valve means, a kick-down switch actuated by the manually operated member, connected in series with a part of the governor operated switch means and serving as a part of the control for the electrical means, a pressure differential and spring operated switch controlled in part by the manually operated member, connected in series with a part of the governor operated switch means and serving as part of the control for the valve means, and electrical means, connected in series with the spring and pressure differential operated switch and adapted to close the throttle of the vehicle when the change gear transmission is being operated.

8. Transmission mechanism and operating means therefor adapted for use in the driving mechanism of an automotive vehicle including a change gear transmission, an overdrive mechanism operably connected to the change gear transmission, a pressure differential operated motor operably connected to the change gear transmission, a solenoid motor operably connected to the overdrive mechanism, and means for controlling the operation of said motors to either selectively effect any one of a plurality of up-shift operations of the transmission mechanism or successively effect a plurality of up-shift operations of said mechanism, and to then effect a plurality of down-shift operations of the transmission mechanism, said control means including valve means for controlling the operation of the pressure differential operated motor, electrical means for controlling the operation of solenoid motor, and means for controlling the operation of the electrical means and valve means including a manually operable member constituting a part of the control means for both the electrical means and the valve means, a governor operated switch means also constituting a part of the control means for both the electrical means and the valve means, a spring and pressure differential operated motor controlled in part by the manually operable member, a switch actuated by the latter motor, connected in series with a part of the governor operated switch means and serving as part of the control for the electrical means, a kick-down switch actuated by the manually operable member, connected in series with the motor operated switch and also serving as part of the control for the electrical means, another spring and pressure differential operated motor controlled in part by the manually operable member, connected in series with a part of the governor operated switch means and serving as part of the control for the valve means, and other electrical means, controlled by the means for controlling the operation of the aforementioned electrical means and valve means, adapted to close the throttle of the vehicle when either the change gear transmission or the overdrive mechanism is being operated.

EARL R. PRICE.

REFERENCES CITED

The following references are of record in the file of this patent:

UNITED STATES PATENTS

| Number | Name | Date |
|---|---|---|
| Re. 21,828 | Fleischel | June 17, 1941 |
| 1,137,507 | McKeever | Apr. 27, 1915 |
| 2,187,824 | Britton | Jan. 23, 1940 |
| 2,225,493 | Barnes | Dec. 17, 1940 |
| 2,263,400 | Schwarz | Nov. 18, 1941 |
| 2,349,147 | Dunn | May 16, 1944 |
| 2,349,185 | Matulaitis | May 16, 1944 |
| 2,349,297 | Neracher et al. | May 23, 1944 |